United States Patent [19]

Hess et al.

[11] 4,067,767

[45] Jan. 10, 1978

[54] LIQUID PHASE COKING OF SPENT KRAFT PULPING LIQUORS

[75] Inventors: Howard Vincent Hess, Glenham; William Francis Franz, Gardiner; Edward Lawrence Cole, Fishkill, all of N.Y.

[73] Assignee: Texaco Inc., New York, N.Y.

[21] Appl. No.: 431,653

[22] Filed: Jan. 8, 1974

Related U.S. Application Data

[63] Continuation-in-part of Ser. No. 295,330, Oct. 5, 1972, abandoned.

[51] Int. Cl.$^2$ .............................................. D21C 11/14
[52] U.S. Cl. ........................................ 162/31; 201/17; 201/25; 423/207; 423/461
[58] Field of Search .................. 162/30, 31, 32, 36, 162/45; 201/17, 25; 423/207, 461; 210/56, 63, 71

[56] References Cited

U.S. PATENT DOCUMENTS

| 2,721,169 | 10/1955 | Mason et al. | 201/17 |
| 2,752,243 | 6/1956 | Barton et al. | 162/31 |
| 3,654,071 | 4/1972 | Brannland et al. | 162/45 X |
| 3,717,545 | 2/1973 | Hess et al. | 162/31 |
| 3,761,349 | 9/1973 | Cole et al. | 162/36 |

*Primary Examiner*—S. Leon Bashore
*Assistant Examiner*—William F. Smith
*Attorney, Agent, or Firm*—Thomas H. Whaley; Carl G. Ries; Henry W. Archer

[57] ABSTRACT

An improved process for treating spent Kraft wood pulping liquors by coking the liquors after reducing the pH thereof with SO$_2$ and recovering the sulfur contained in the resulting coke by contact with hydrogen preheated to temperatures in the range of 750° to 2000° F to produce H$_2$S. The H$_2$S and lime are added to the coker effluent to form new kraft cooking liquor.

4 Claims, 1 Drawing Figure

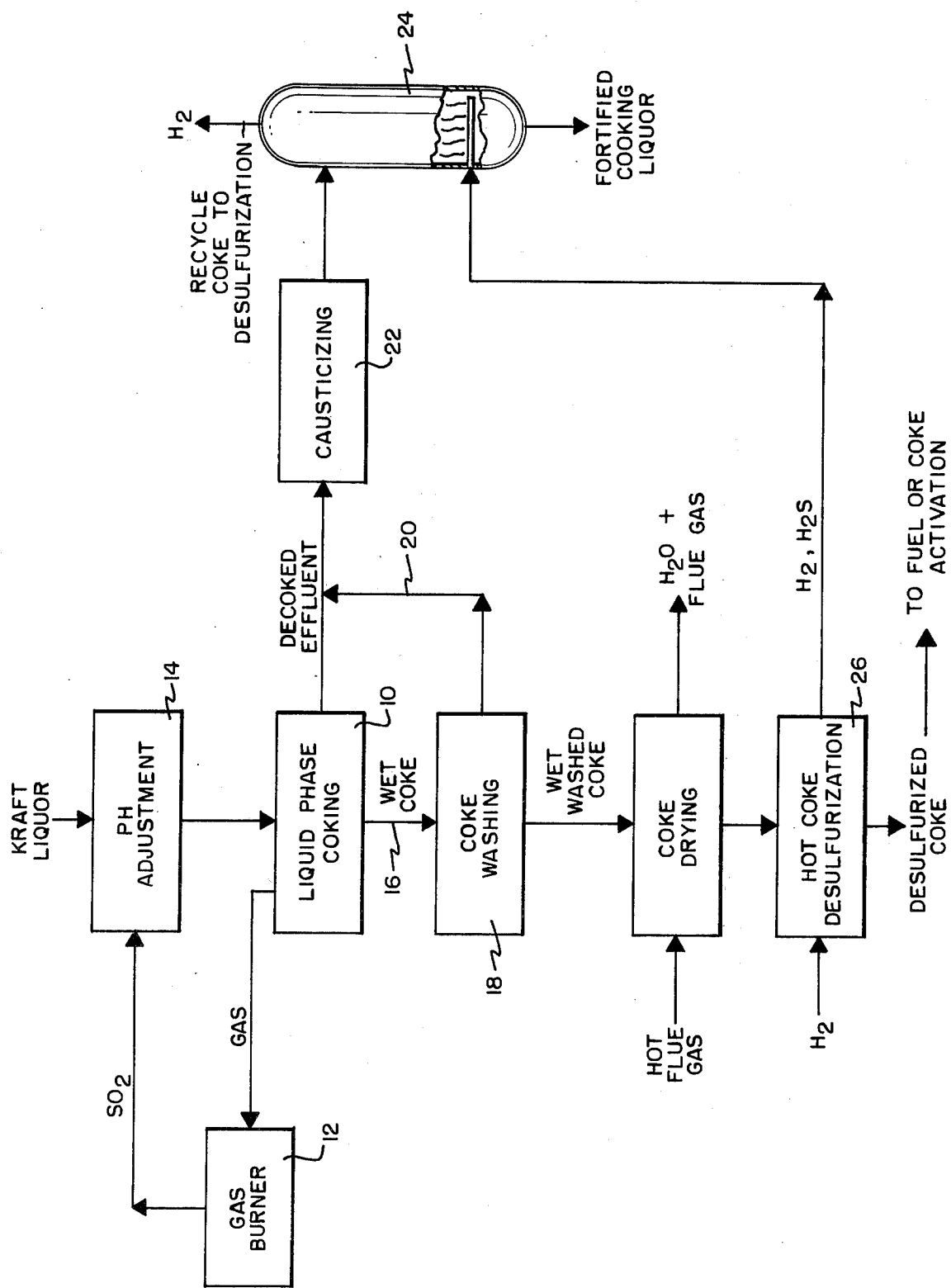

LIQUID PHASE COKING OF SPENT KRAFT PULPING LIQUORS

CROSS REFERENCE TO CO-PENDING APPLICATION

This application is a continuation-in-part of coassigned application Ser. No. 295,330 filed Oct. 5, 1972, now abandoned.

BACKGROUND OF THE INVENTION

1. Field of the Invention

This invention is directed to an improvement in the treatment of spent Kraft wood pulping liquors whereby sulfur contained in the coke resulting from the treatment is recovered as hydrogen sulfide which is in turn used to produce one of the pulping chemicals, $Na_2S$.

2. Description of the Prior Art

In commonly assigned copending application, U.S. Ser. No. 149,672, filed June 3, 1971 now abandoned is disclosed and claimed a process wherein spent alkaline Kraft pulping liquors are flowed to an absorbing zone and extraneous sulfur dioxide is added thereto to lower the pH of the liquors to below 7 and preferably between 2 and 5 prior to coking them in the liquid phase under autogenous pressure in a coking zone thereby forming coke, gases including $H_2S$ and an aqueous effluent.

The coke is separated from the effluent in a separating zone and burned to produce the above-mentioned sulfur dioxide. Lime and $H_2S$ are added to this effluent in a second absorbing zone to reconstitute Kraft cooking liquor.

Examination of the table appearing below, shows that liquid phase coking of the liquor after reducing its pH is considerably more efficient in terms of lowering the COD of the coker effluent. This is consistent with the higher coke yield and also with the higher gas yield. The sulfur content of the coke from the low pH run is much higher. The gas composition is markedly changed with the bulk of the sulfur from the low pH run appearing as $H_2S$. This is desirable in Kraft pulping because $H_2S$ is a useful makeup chemical for production of $Na_2S$, one of the pulping chemicals.

Various techniques have been employed for reducing the sulfur content of petroleum coke. Thus U.S. Pat. No. 2,768,939 is a particular variation of the Esso fluid coking in which the hot petroleum coke is contacted with hydrogen at 1200°-1400° F. to remove sulfur from the coke. Petroleum coke is extremely dense and long times, 12 hours, are needed to reduce the sulfur content from 7 percent of 2 percent at a processing temperature of 1300° F. U.S. Pat. No. 2,721,169 claims an improved method of reducing the sulfur content of petroleum coke by preoxidizing the coke with air (oxygen) followed by hydrogen treatment. The purpose of the air pretreatment is to form pores in the dense coke particles thereby improving the accessibility of the sulfur to hydrogen attack.

With the present invention only 2 hours of processing at 1350° F. are needed to reduce the sulfur content from 14 percent to 2.14 percent. The properties of a fluid coke are compared below with the properties of the solids recovered from coking a Kraft spent liquor.

| Sample | Petroleum Fluid Coke | Coked Solids from Kraft Liquor |
|---|---|---|
| Particle Density, g./cc | 1.4 | Less than one[1] |
| Carbon, wt. % | 89.1 | 51.2 |
| Sulfur, Wt. % | 6.0 | 14.0 |
| Ash, wt. % | 0.16 | 13.7 |
| Metals | V,Ni,Fe,Si | Na,Ca |
| Combustion | Will support combustion only in the presence of oil. | Will burn readily |

[1]Fluffy solid that readily floats on water.

Petroleum coke is a dense carbon containing material containing no oxygen while Kraft coked solids are estimated to contain at least 15 per cent oxygen. Accordingly, different techniques are needed to reduce the sulfur content in each case.

LIQUID PHASE COKING OF SPENT KRAFT LIQUOR 550° F, 1100 psig, 2 HOURS

| | Kraft Liquor pH 12.1 | | Kraft Liquor with pH Adjusted To 4.8 with $SO_2$ | |
|---|---|---|---|---|
| COD of Charge | 195.6 | g COD/ liter | 195.6 | g /COD /Liter |
| Liquid COD of Coker Effluent | 85.9 | g COD/liter | 30.4 | g COD/liter |
| COD Reduction % | 56 | | 84.5 | |
| Washed dry coke Yield wt. % | 3.12 | | 5.9 | |
| Wt. % Sulfur | 2.07 | | 14.0 | |
| Produced gas Yield wt. % | 0.53 | | 2.81 | |
| Analysis Mol.% | | | | |
| Dimethyl Sulfide | 38.7 | | 0.5 | |
| Methyl mercaptan | 18.0 | | 2.4 | |
| Carbon dioxide | 8.75 | | 61.0 | |
| Hydrogen sulfide | 1.45 | | 32.5 | |
| Ethane | 1.0 | | 0 | |
| Methane | 6.1 | | 0.7 | |
| Hydrogen | 26.0 | | 3.0 | |

SUMMARY OF THE INVENTION

The practice of the instant invention has to do with the high sulfur coke product produced in the low pH run. It is desirable to remove this sulfur so that it can be recycled to the wood pulping process. It is further desirable to remove it if the coke is to be burned as to avoid possible air pollution by $SO_2$ when the coke is used as a fuel.

It has been found in accord with this invention that this coke can be desulfurized with hydrogen preheated to 750° to 1200° F., whereby the sulfur is removed as $H_2S$. In Kraft pulping it is desirable to have the sulfur as $H_2S$ because it can be used directly as such to refortify the pulping liquor going to the wood digester.

In an example of the practice of the invention it was found that treating the high sulfur coke with hydrogen at 1350° F and 15 psig for two hours a desulfurized coke was obtained. The initial charge coke contained 14 wt % sulfur. The treated coke contained 2.14% sulfur and its yield was 53 wt % of the charged coke. Taking into account the yield, 92% of the sulfur in the charge coke was recovered as $H_2S$ by the hydrogen treatment.

In the practice of the invention the $H_2S$ is recovered from the $H_2$, $H_2S$, stream produced during coke desulfurization by contacting it with pulping liquor in need of sulfur refortification before being returned to the wood digester. The $H_2S$ is then absorbed in the caustic pulping liquor and the $H_2$ is recycled to the coke desulfurization step.

The drawing shows an embodiment of the process wherein coke desulfurization is integrated with a Kraft liquor wood pulping process wherein the spent liquor is coked in the liquid phase.

As shown sulfur-containing gas produced by liquid phase coking in coker 10 is passed to gas burner 12 and burned to produce $SO_2$ which is sent on to receiving tank 14 where it reduces the pH of the spent Kraft liquor to between 2 and 7 prior to coking in coker 10. Coking in coker 10 is effected at a temperature in the range 450° to 700° F under autogenous pressures of about 1000° to about 3000 psi for a period of about 0.5 minutes to 6 hours. The coke which forms is sent on through line 16 to a washing unit 18. Some of the hot decoked effluent can be partially flashed to supply water for washing the wet coke and the washings can be combined with the flashed decoked effluent through line 20. The combined liquids then are flowed to causticizing tank 22 where lime is added, then to an absorber 24 where $H_2S$ produced as will be indicated below is absorbed by the causticized decoked effluent to produce a fortified liquor for wood digestion.

The wet washed coke is dried with hot flue gas in drying unit 21 and thhe hot dry coke is treated with hot hydrogen in desulfurizing unit 26 to accomplish the desulfuriation reaction. The $H_2$, $H_2S$ stream from the desulfurization unit is passed to absorber 24. The $H_2$ passes through the absorber and is recycled to the coke desulfurization step. Desulfurized coke is produced as a product. The heat in the hot desulfurized coke can be utilized for preheating the hydrogen.

A portion of the hot dry coke amounting to 5.5 parts by weight was placed in unit 26 on a wire mesh diffusion plate mounted in an upright tube reactor. Using a bottom inlet, the reactor was purged with nitrogen followed by a stream of hydrogen at a rate of 0.535 parts by weight per hour. The lower portion of the tube reactor, that is that portion lying below the diffusion plate serived as a preheater for that hydrogen that was introduced to the preheater at room temperature. The preheater and the reactor section above the diffusion plate were heated by electrical windings. With the introduction of hydrogen the temperature was raised over a 2½ hour period until an average temperature 1350° F. was achieved. This treating temperature was then held for 2 hours after which the electrical current was turned off. The flow of hydrogen was continued for about 2 hours to cool the treated product. 2.9 parts of treated solids were recovered for a 53 percent yield by weight. The treated coke contained 2.14 weight per cent sulfur. The great advantage of this treatment is evident when it will be recalled that the charge contained 14 weight per cent sulfur. Taking into account the yield, 92 percent of the sulfur of the charge coke was recovered as $H_2S$ by the hydrogen treatment.

In the present process the temperature at which the hydrogen is reacted with the coke is critical. Ideally the hydrogen should be preheated to the reactor temperature of around 1350° F. By so doing maximum use of the reactor is made other wise a portion of the reactor must be used to heat the hydrogen. The preheated hydrogen also may be heated above the reactor temperature to provide a part of the heat of reaction. Injecting hydrogen preheated to between 750° and 2000° F. is suitable with the range of 1000° to 1500° F. being preferred.

"Desulfurized" for the purpose of this invention means the production of a material of reduced sulfur content. This is the traditional usage in the petroleum industry and is not meant to convey an absolutness as meaning free from sulfur. It would probably be better to say, reduced sulfur content. In the particular example, the sulfur content of the solids were reduced from 14 percent to 2.14 percent. Taking into account the yield, 92 percent of the sulfur in solids was removed and remained as hydrogen sulfide. Advantgeously over 90 percent of the sulfur is removed from the solids.

Although preferred embodiments only of the invention have been given, it is to be understood that the invention is not limited thereto but may be otherwise embodied or practiced within the scope of the following claims.

The embodiments of the invention in which an exclusive property or privilege is claimed are define as follows:

1. In a proceess for treating spent alkaline Kraft pulping liquors, the steps of flowing said liquor to an absorbing zone and adding $SO_2$ to said liquors in said zone to lower the pH thereof to below 7; coking said liquors in the liquid phase under autogenous pressure of about 1000 to about 3000 psi at 450° F to 700° F for 0.5 minutes to 6 hours in a coking zone thereby forming coke, gases, and an aqueous effluent; separating in a separating zone said coke from said effluent; burning said gas to produce said sulfur dioxide; drying said coke with flue gas; the improvement comprising preheating hydrogen to 700° to 2000° F. passing said hydrogen over said coke to reduce the sulfur content of said coke and produce $H_2S$ and adding lime and said $H_2S$ to said effluent in an absorbing zone to form new Kraft cooking liquor.

2. The process according to claim 1 wherein the pH of the liquor is brought down to between 2 and 5 before coking.

3. The process according to claim 1 wherein said hydrogen is preheated by passage over said hot desulfurized coke.

4. The process of claim 1 wherein said hydrogen is heated to 1000° to 1500° F.

* * * * *